United States Patent Office 3,293,216
Patented Dec. 20, 1966

3,293,216
DERIVATIVES OF POLYCROTONALDEHYDE
Jerry Norman Koral, Stamford, Conn., assignor to American Cyanamid Company, Stamford, Conn., a corporation of Maine
No Drawing. Filed Mar. 1, 1963, Ser. No. 262,255
9 Claims. (Cl. 260—67)

This invention relates to novel derivatives of polycrotonaldehyde. More particularly this invention relates to novel derivatives of polycrotonaldehyde which derivatives possess excellent thermal softening properties. Still more particularly, this invention relates to polycrotonaldehyde derivatives which are produced from the vinyl polymer of crotonaldehyde and which possess thermal softening properties superior to those of the crotonaldehyde homopolymer per se.

Crotonaldehyde has been polymerized, via aldol polymerization, into low molecular weight polymers for many years, see U.S. Patent 2,190,184; Journal of Polymer Science, vol. 10, pages 149–154 (1953); Journal of Polymer Science, vol. 7, pages 653–655 (1951). Vinyl addition polymers of crotonaldehyde were not known, however, prior to my discovery thereof as taught in my copending application, Serial No. 119,817, filed June 27, 1961, now U.S. Patent No. 3,163,622. In that application, a method for the production of homopolymeric crotonaldehyde having molecular weights ranging from about 1000 to about 5000 via addition vinyl polymerization is disclosed and claimed. These vinyl polymers, according to evidence obtained via infrared and ultraviolet light analysis, have a structure represented by the formula

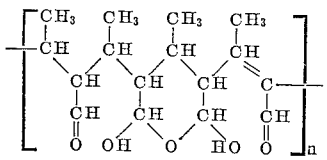

wherein $n$ is the number of recurring units in the polymer. This structure was formulated from all the available data and contains all the groups observed in the analyses in their approximate concentrations. While this polymer is excellent for the uses disclosed in my copending application, identified above, it has thermal properties which render it somewhat undesirable for many high temperature uses.

I have now unexpectedly discovered that crotonaldehyde addition polymers having excellent thermal softening properties can be produced by forming various derivatives of the vinyl crotonaldehyde polymers. That is to say, by forming various derivatives of the crotonaldehyde polymers disclosed in my copending application, I have now discovered, quite surprisingly, that polymers can be produced which have thermal softening properties 1.5 to 2 times better than the pure crotonaldehyde addition polymer.

It is therefore an object of the present invention to provide novel derivatives of polycrotonaldehyde.

It is a further object of the present invention to provide novel derivatives of polycrotonaldehyde which possess excellent thermal softening properties.

It is still a further object of the instant invention to present polycrotonaldehyde derivatives which are produced from the vinyl polymer of crotonaldehyde and which possess thermal softening properties superior to those of crotonaldehyde homopolymer per se.

The novel derivatives of polycrotonaldehyde which form the basis for the present invention can be represented by recurring units of the formula

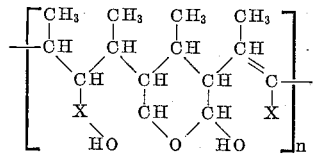

wherein $n$ is the number of recurring units in the polymer and X is any one of the following radicals A, B or C;

(A) —CHOH—SO$_3$Y
wherein Y is an alkali metal;
(B) —COOH or
(C) —CH=N-Z
wherein Z is
(1) OH
(2) —NH—R
wherein R is an aryl or substituted aryl radical of 6 to 10 carbon atoms, said substituents being a halogen, nitro or cyano radical or
(3) —NH—CO—NH$_2$.

The methods of forming the novel polycrotonaldehyde derivatives of the present invention are not critical and generally any method known for the formation of sulfites, acids, oximes, etc. from aldehydes may be used herein. Typical procedures for the formation of these novel derivatives are, however, set forth hereinbelow.

The derivatives wherein X represents radical A may be produced by reacting a linear crotonaldehyde addition polymer with an aqueous solution of a bisulfite having the formula $$YHSO_3$$

wherein Y is an alkali metal, at reflux temperature for from about 30 minutes to about 3 hours. The resultant product is recovered by distilling off the water (or otherwise removing it) and washing and drying the solid remaining. Examples of bisulfite compounds which may be used include sodium bisulfite, lithium bisulfite, potassium bisulfite, rubidium bisulfite, cesium bisulfite and the like.

Amounts of bisulfite ranging from about 20% to 250%, preferably about 40% to 150%, by weight, based on the weight of the crotonaldehyde addition polymer may be used.

Those derivatives wherein X represents radical B may likewise be produced by any known oxidation method for the production of acids from aldehydes, and as such, the procedures for the production of the acid derivatives form no part of the present invention. A typical oxidation procedure comprises reacting the linear crotonaldehyde addition polymer with hydrogen peroxide in the presence of a basic material such as sodium hydroxide, potassium hydroxide and the like. Amounts of hydrogen peroxide ranging from about 10% to about 70%, by weight, based on the weight of the crotonaldehyde polymer may be used. The reaction is conducted at temperatures ranging from about 25° C. to about 90° C. and the derivative is recovered by precipitation, filtration, washing with water and drying.

Those derivatives wherein X represents the radical C–1 may also be produced by any known oxime production procss, an example of which comprises, reacting the linear crotonaldehyde addition polymer with from about 20% to about 120%, by weight, based on the weight of the polymer of, for example, hydroxylamine hydrochloride in the presence of a pyridine-ethanol solution. The reaction is allowed to continue for from 2 to 6 hours at 0° C. to 50° C. Sodium hydroxide, or other base, is then added to reduce the pH of the system and the derivative is then recovered by precipitation, filtration, washing with water and drying.

These derivatives wherein X represents the radical C–2 may be produced by reacting an appropriately substituted arylhydrazine with the linear crotonaldehyde addition polymer, although any applicable method for the production of hydrazine derivatives from aldehydes may be used. Generally, the arylhydrazine is reacted in amounts ranging from about 100% to about 450%, by weight, based on the weight of the polymer, in the presence of an aliphatic alcohol, e.g., ethanol. The reaction is conducted at reflux temperatures. An acid is added at the end of ½ to 2 hours to adjust the pH of the system. Unreacted arylhydrazine is removed by filtration and the hydrazone derivative is recovered by precipitation from hexane, washed with hexane and dried.

Typical examples of arylhydrazines which may be used include 2,4 - dinitrophenylhydrazine, phenylhydrazine, naphthylhydrazine, 3-chlorophenylhydrazine, 2,5-dicyanophenylhydrazine and the like.

The derivatives wherein X represents the radical C–3 are produced by any known semicarbazone production method, a typical example of which comprises reacting an alcohol solution of the linear crotonaldehyde addition polymer with semicarbazide·HCl (in a ratio of about 1:1) in admixture with an alkali acetate, e.g., sodium acetate. The reaction is carried out at temperatures ranging from about 70° C. to 100° C. utilizing equimolar amounts of polymer and semicarbazide·HCl. Unreacted carbazide is removed by filtration and the derivative is recoverd by precipitation from water. The product is washed and dried to recover it.

As mentioned above, these novel derivatives quite unexpectedly possess thermal softening points which are much higher than the unmodified linear crotonaldehyde addition polymer and, as such, the novel polycrotonaldehyde derivatives of the present invention may be used for the production of thermosetting, cross-linked surface coatings, water-soluble films and coatings, packaging material, floor wax formulations, or any other uses wherein good solvent resistance and high thermal softening are required. They may also be used as resin additives to impart these highly desirous properties to other resinous materials.

The following examples are set forth for purposes of illustration only and are not to be construed as limitations on the present invention except as set forth in the appended claims. All parts and percentages are by weight unless otherwise specified.

*Example 1*

A mixture of 1.0 part of polycrotonaldehyde, prepared as described in my copending application, Serial No. 119,817, filed June 27, 1961, now U.S. Patent No. 3,163,622, and 15.0 parts of a 10% aqueous solution of $NaHSO_3$, is refluxed for 1 hour. During this time the polycrotonaldehyde dissolves and a slightly hazy solution forms. The solvent is then removed by vacuum evaporation at room temperature. The polymer is washed with 20 parts of methanol to remove any unreacted polycrotonaldehyde. The resin is dried under vacuum at 50° C. for 24 hours. The yield of the bisulfite addition product is 0.79 part. Infrared analysis shows the presence of the $-SO_3Na$ bands and the disappearance of the carbonyl bands. This derivative is water-soluble and the films prepared from the water solution, are solvent resistant to xylene and acetone after 1 day. The polymer does not soften up to 200° C. and at this temperature some decomposition starts to occur.

*Example 2*

Following the procedure of Example 1, 80% of the bisulfite derivative of polycrotonaldehyde is produced utilizing potassium bisulfite as the reagent. The softening point of the derivative is over 200° C.

*Example 3*

A solution of 1.0 part of polycrotonaldehyde, prepared as set forth in Example 1, in 10 parts of methanol, is prepared. Water is added until a slight haze is noted and this is removed by the addition of a small quantity of methanol. Then 1.0 part of semicarbazide·HCl (1:1) and 1.5 parts of sodium acetate are added to the solution. The reaction mixture is heated on a steam bath for 30 minutes. The solution is filtered hot to remove the unreacted carbazide and the filtrate is added to an excess of water. A fluffy white precipitate forms and it is washed several times with water. The resin is dried in a vacuum oven at 50° C. for 24 hours. The yield of the derivative is 0.82 part. Infrared analysis shows the presence of the semicarbazone bands. This polymer has a softening point of about 160° C. compared to 75° C. for the unmodified polycrotonaldehyde.

*Example 4*

A mixture of 30 parts of a 0.5 N solution of hydroxylamine hydrochloride and 100 parts of a 2% pyridine solution in 95% ethanol is placed in a reaction vessel. Then 1.94 parts of polycrotonaldehyde, prepared as described in Example 1, are added and the reaction mixture is stirred for 4 hours at 25° C. Twenty-nine parts of 0.5 N sodium hydroxide is added and the solution is stirred for 15 minutes. The solution is then reduced to one third of its original volume by vacuum evaporation at room temperature. The concentrated solution is added dropwise to a large excess of water and the polymer precipitates. It is washed several times with water and dried in a vacuum oven at 50° C. for 24 hours. A yield of 1.12 parts of the oxime derivative is obtained. The infrared spectrum shows the disappearance of the carbonyl bands and the presence of the ($-C=N-$) bands. The oxime derivative has a softening point of 117° C.

*Example 5*

A mixture of 20 parts of 5% NaOH and 30 parts of 3% hydrogen peroxide is placed in a reaction vessel and heated to 65° C. One part of polycrotonaldehyde, prepared as in Example 1, is added and the mixture is kept at 65° C. for 15 minutes. Then, an additional 10 parts of 3% $H_2O_2$ is added and the mixture is kept at 65° C. for 10 minutes. The solution is cooled and then acidified to congo red paper with 0.5 N HCl. The polymeric derivative precipitates. The polymer is washed with water and dried in a vacuum oven at 50° C. for 24 hours. A yield of 0.25 part of the derivative is isolated. Infrared analysis shows the presence of carboxyl groups and the polymer is soluble in dilute and concentrated $NH_4OH$. The acid derivative has a softening point of 144° C. compared to 75° C. for the unmodified polymer.

*Example 6*

A mixture of 1.0 part of polycrotonaldehyde, prepared as described in Example 1, 3.7 parts of 2,4-dinitrophenylhydrazine and 150 parts of 95% ethanol is added to a reaction vessel. The solution is heated at reflux for one hour. Then, 150 parts of a 37% HCl solution are added and the reaction mixture heated for an additional 5 minutes. It is cooled to room temperature and the slurry filtered to remove the unreacted 2,4-dinitrophenylhydrazine. The filtrate is added to hexane and the polycrotonaldehyde derivative precipitates. The resin is washed with fresh hexane and then dried in a vacuum oven at 50° C. for 24 hours. A yield of 1.0 part of the derivative is obtained. The infrared spectrum shows the disappearance of the carboxyl bands and the presence of the

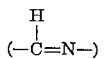

and phenyl bands. This derivative has a softening point of 150° C.

*Example 7*

Following the procedure of Example 6, except that equivalent amounts of phenylhydrazine are substituted for the dinitro compound, 88% of the phenylhydrazone derivative of polycrotonaldehyde is recovered. It has a softening point of 155° C.

*Example 8*

The procedure of Example 6 is again followed except that equal amounts of 3-chloronaphthylhydrazine are used instead of the dinitro compound. A derivative of the crotonaldehyde polymer having a softening point of 146° C. is recovered in a yield of 79%.

*Example 9*

Again following the procedure set out in Example 6, a hydrazone derivative of linear crotonaldehyde addition polymer is recovered utilizing 3,5-dicyanophenylhydrazine in place of the dinitro compound. The yield of product is 86% and the softening point thereof is 149° C.

I claim:

1. A polymer possessing excellent thermal softening properties comprising recurring units of the formula

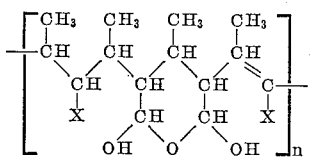

wherein $n$ is the number of recurring units in the polymer and X is selected from the group consisting of (A) —CHOH—SO$_3$Y
wherein Y is an alkali metal
(B) —COOH and
(C) —CH=N—Z
wherein Z is selected from the group consisting of
(1) —NH—R
wherein R is selected from the group consisting of an aryl radical and a substituted aryl radical, each of said aryl radicals having from 6 to 10 carbon atoms, inclusive, and
(2) —NH—CO—NH$_2$.

2. A polymer possessing excellent thermal softening properties comprising recurring units of the formula

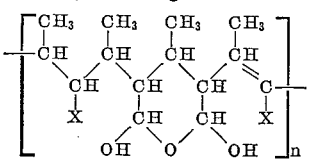

wherein $n$ is the number of recurring units in the polymer and X is —CHOH—SO$_3$Y and Y is an alkali metal.

3. A polymer possessing excellent thermal softening properties comprising recurring units of the formula

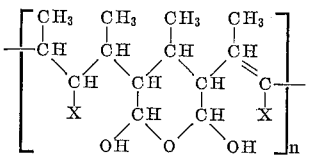

wherein $n$ is the number of recurring units in the polymer and X is —COOH.

4. A polymer possessing excellent thermal softening properties comprising recurring units of the formula

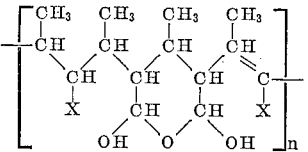

wherein $n$ is the number of recurring units in the polymer and X is —CH=N—Z wherein Z is selected from the group consisting of (1) —NH—R
wherein R is selected from the group consisting of an aryl radical and a substituted aryl radical, each of said radicals having from 6 to 10 carbon atoms, inclusive, and
(2) —NH—CO—NH$_2$.

5. A polymer according to claim 4 wherein Z is —NH—R and wherein R is selected from the group consisting of an aryl radical and a substituted aryl radical, each of said radicals having from 6 to 10 carbon atoms, inclusive.

6. A polymer according to claim 4 wherein Z is —NH—CO—NH$_2$.

7. A polymer according to claim 4 wherein Z is —NH—R and wherein R is a dinitrophenyl radical.

8. A polymer according to claim 4 wherein Z is —NH—R and wherein R is a phenyl radical.

9. A polymer according to claim 2 wherein Y is sodium.

References Cited by the Examiner

UNITED STATES PATENTS

| | | | |
|---|---|---|---|
| 2,554,973 | 5/1951 | Ballard et al. | 260—67 |
| 2,657,192 | 10/1953 | Miller et al. | 260—67 |
| 2,809,185 | 10/1957 | Hearne et al. | 260—67 |
| 2,985,610 | 5/1961 | Blanchette et al. | 260—67 |
| 3,079,296 | 2/1963 | Houff et al. | 260—67 |
| 3,121,700 | 2/1964 | Bergman | 260—67 |
| 3,163,622 | 12/1964 | Koral | 260—67 |

WILLIAM H. SHORT, *Primary Examiner.*

SAMUEL H. BLECH, L. M. MILLER,
*Assistant Examiners.*